(12) United States Patent
Jeon et al.

(10) Patent No.: US 12,722,712 B2
(45) Date of Patent: Sep. 1, 2026

(54) ROOF STRUCTURE FOR VEHICLE

(71) Applicants: Hyundai Motor Company, Seoul (KR); Kia Corporation, Seoul (KR)

(72) Inventors: Chan Woong Jeon, Incheon (KR); Youngrock Kim, Gwangmyeong-si (KR); HaeHoon Lee, Seoul (KR); ChangHak Kang, Hwaseong-si (KR); Sang Kyoung Han, Gunpo-si (KR); Kwangok Han, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 602 days.

(21) Appl. No.: 18/325,546

(22) Filed: May 30, 2023

(65) Prior Publication Data

US 2024/0109596 A1 Apr. 4, 2024

(30) Foreign Application Priority Data

Oct. 4, 2022 (KR) ........................ 10-2022-0125959

(51) Int. Cl.
*B62D 25/07* (2006.01)
*B62D 27/02* (2006.01)
*B62D 27/06* (2006.01)

(52) U.S. Cl.
CPC ........... *B62D 25/07* (2013.01); *B62D 27/026* (2013.01); *B62D 27/065* (2013.01)

(58) Field of Classification Search
CPC ...... B62D 25/07; B62D 25/06; B62D 27/026; B62D 27/065
USPC .................................................. 296/213, 210
See application file for complete search history.

(56) References Cited

U.S. PATENT DOCUMENTS 4,582,358 A * 4/1986 Draper .................. B60J 7/0084 296/213
4,883,310 A * 11/1989 Miyazaki .............. B62D 25/06 296/210
6,332,645 B1 * 12/2001 Schwarz .................. B60J 10/40 296/213
6,367,872 B1 * 4/2002 Bohm .................... B62D 65/14 296/210
6,543,841 B1 * 4/2003 Ohkubo ................. B62D 25/06 296/210
6,880,884 B2 * 4/2005 Sugiura ...................... B60J 7/04 296/213
7,441,832 B2 * 10/2008 Ratajski .................. B60R 21/13 296/187.06
7,604,286 B2 * 10/2009 Watanabe ............. B62D 25/06 296/210

(Continued)

FOREIGN PATENT DOCUMENTS

CN 206885185 U * 1/2018 ............. B62D 25/04
DE 102005044283 A1 * 4/2007 ............. B62D 25/06

(Continued)

*Primary Examiner* — Hilary L Gutman
(74) *Attorney, Agent, or Firm* — Slater Matsil, LLP

(57) ABSTRACT

An embodiment roof structure for a vehicle includes a plurality of roof rail assemblies disposed along a vehicle width direction of a vehicle body and connected to a pair of side structures that are disposed on each side of the vehicle body along a front to rear direction of the vehicle body and a roof module connected to the plurality of roof rail assemblies.

20 Claims, 8 Drawing Sheets

(56) References Cited

U.S. PATENT DOCUMENTS 8,807,638 B2 * 8/2014 Schroferl .............. B62D 25/07 296/213
10,065,694 B1 * 9/2018 Rompage .............. B62D 25/06
2003/0067191 A1 * 4/2003 Ohkubo ................ B62D 25/06 296/210
2003/0111870 A1 * 6/2003 Frank de Waal .......... B60J 7/04 296/211
2005/0146163 A1 * 7/2005 Martinez ............... B62D 25/06 296/214
2006/0202518 A1 * 9/2006 Osterberg ............. B62D 25/06 296/193.12
2008/0129025 A1 * 6/2008 Ratajski ................ B62D 25/06 296/187.03
2011/0133521 A1 * 6/2011 Yu ......................... B62D 25/06 296/210
2014/0183902 A1 * 7/2014 Seo ...................... B62D 23/005 296/181.1
2016/0236721 A1 * 8/2016 Nakamura ............. B62D 25/06
2016/0236722 A1 * 8/2016 Nakamura ............. B62D 25/06
2017/0190300 A1 * 7/2017 Maranville ............ B62D 25/06
2017/0305242 A1 * 10/2017 Gallagher .............. B62D 25/04
2018/0208022 A1 * 7/2018 Caliskan ................ B60H 1/245
2018/0297644 A1 * 10/2018 Rompage ............... C25D 13/12
2019/0232315 A1 * 8/2019 Mousavi Ehteshami .................... B05B 14/00
2019/0299760 A1 * 10/2019 Fukada ...................... B60J 7/02
2020/0049535 A1 * 2/2020 Krishnan ............... G01C 21/26
2020/0086833 A1 * 3/2020 Frederick ................ G01S 7/027
2020/0101905 A1 * 4/2020 Taylor ....................... B60R 9/04
2020/0290434 A1 * 9/2020 Kiyoshita ................ B60J 1/006
2022/0204089 A1 * 6/2022 Ueno ................... B62D 25/025
2022/0288993 A1 * 9/2022 Harmon ................. B60H 1/245
2024/0369387 A1 * 11/2024 Zhang ....................... B60S 1/56
2025/0121888 A1 * 4/2025 Kang ..................... B62D 25/02

FOREIGN PATENT DOCUMENTS

EP 1808363 A1 * 7/2007 ............. B62D 25/06
GB 2295801 A * 6/1996 .............. B60J 10/20
JP 2022185365 A * 12/2022
WO WO-2009066552 A1 * 5/2009 ............. B62D 25/06
WO WO-2012077437 A1 * 6/2012 ............. B62D 25/06

* cited by examiner 100
55
57
53
57
50
51
57
70
10
10
11
3
13
11
13
20
1

100
10
11
13
11
20
11
13
11
10

ROOF STRUCTURE FOR VEHICLE

CROSS-REFERENCE TO RELATED APPLICATIONS

This application claims the benefit of Korean Patent Application No. 10-2022-0125959, filed on Oct. 4, 2022, which application is hereby incorporated herein by reference.

TECHNICAL FIELD

The present invention relates to a vehicle body of a vehicle.

BACKGROUND

Recently, the vehicle industry is introducing a new concept of future mobility vision for realizing a human-centered, dynamic future city. One of these future mobility solutions is a purpose built vehicle (PBV) as a purpose-based mobility.

A PBV may be an example of an electric vehicle (EV)-based environment-friendly mobile vehicle. These PBVs may set the optimal path for each situation by utilizing artificial intelligence and unmanned autonomous driving and may also perform platooning.

The PBV can provide various customized services to users while moving from the ground to the destination in an unmanned autonomous driving method. For this purpose, the PBV is manufactured in a one box design with a large interior space.

In one example, a roof panel of a large area is applied to a roof structure of a PBV in order to provide users with a wide indoor space. In another example, a roof glass (or sunroof glass) is applied to a roof structure of a PBV to provide a user with an open feeling of the interior.

Matters described in this background section are prepared to enhance understanding of the background of embodiments of the invention and may include matters other than conventional art already known to a person of an ordinary skill in the field to which this application belongs.

SUMMARY

The present invention relates to a vehicle body of a vehicle. Particular embodiments relate to a roof structure of a vehicle body for a purpose built vehicle (PBV).

Embodiments of the present disclosure provide s a roof structure for a vehicle in which various functional parts may be mounted while securing the strength of a vehicle body having a one box design.

A roof structure for a vehicle according to an exemplary embodiment of the present invention may include a plurality of roof rail assemblies connected to a side structure along the vehicle width direction of the vehicle body and disposed along the front to rear direction of the vehicle body and at least one roof module connected to the plurality of roof rail assemblies along the vertical direction.

Each of the plurality of roof rail assemblies may include an upper rail panel and a lower rail panel connected together to form a closed cross-section.

The at least one roof module may include at least one of a sensor roof module, an air conditioning roof module, and a glass roof module disposed adjacent to each other along the front to rear direction of the vehicle body.

A roof structure for a vehicle according to an exemplary embodiment of the present invention may include a plurality of roof rail assemblies including an upper rail panel and a lower rail panel connected to each other and connected to a side structure along a vehicle width direction of a vehicle body, at least one roof module connected to the plurality of roof rail assemblies, and a module mounting unit configured to engage the at least one roof module and the plurality of roof rail assemblies along a vertical direction.

The upper rail panel may include an upper flange portion formed on both edge portions along the front to rear direction of the vehicle body and an upper rail portion formed between the upper flange portions.

The lower rail panel may include a lower flange portion formed on both edge portions along the front to rear direction of the vehicle body and a lower rail portion formed between the lower flange portions.

The upper flange portion and the lower flange portion may be connected to each other, and a closed space may be formed between the upper rail portion and the lower rail portion.

The module mounting unit may include at least one mounting bracket connected to a lower surface of the base provided in the at least one roof module, an engage bolt fixed to the at least one mounting bracket so as to pass through the upper flange portion and the lower flange portion connected together in a vertical direction, and a fastening nut that engages the engage bolt.

The module mounting unit may include at least one mounting bracket connected to a lower surface of the base provided in the at least one roof module, an engage bolt fixed to the at least one mounting bracket to pass through the upper rail portion along a vertical direction, and a fastening nut that penetrates the lower rail portion and engages the engage bolt.

The roof structure for a vehicle according to an exemplary embodiment of the present invention may further include an adhesive sealer applied between a lower edge portion of the base provided in at least one roof module and the roof side of the side structure and applied between the lower edge portion of the base provided in at least one roof module and the upper rail panel of a plurality of roof rail assemblies.

The roof structure for a vehicle according to an exemplary embodiment of the present invention may further include a weather strip provided between the at least one roof module disposed adjacent to each other.

The roof structure for a vehicle according to an exemplary embodiment of the present invention may further include an adhesive sealer applied between a lower edge portion of the base provided in at least one roof module disposed adjacent to each other and the roof side of the side structure and applied between the lower edge portion of the base provided in the at least one roof module and the upper rail panel.

A drainage path may be formed along the vehicle width direction of the vehicle body between the adhesive sealers adjacent to each other on the upper surface of the upper rail panel.

The upper rail panel may include at least one drainage channel formed along the drainage path.

A path extension may be formed on one of the adjacent adhesive sealers to extend the drainage path to at least one of a plurality of pillars provided on the side structure.

According to the exemplary embodiments of the present invention, at least one roof module equipped with various functional parts is supported through a plurality of roof rail assemblies, and the strength of a vehicle body with a one box design can be secured.

In addition, according to the exemplary embodiments of the present invention, it is possible to secure a wider interior space and watertight performance of the PBV and to promote the expandability of the service concept of the PBV.

In addition, the effects that can be obtained or predicted due to the embodiments of the present invention will be directly or implicitly disclosed in the detailed description of the embodiments of the present invention. That is, various effects expected according to embodiments of the present invention will be disclosed within the detailed description to be described later.

BRIEF DESCRIPTION OF THE DRAWINGS

Since these drawings are only for reference in explaining exemplary embodiments of the present invention, the technical ideas of embodiments of the present invention should not be construed as limited to the accompanying drawings.

Figure 1:
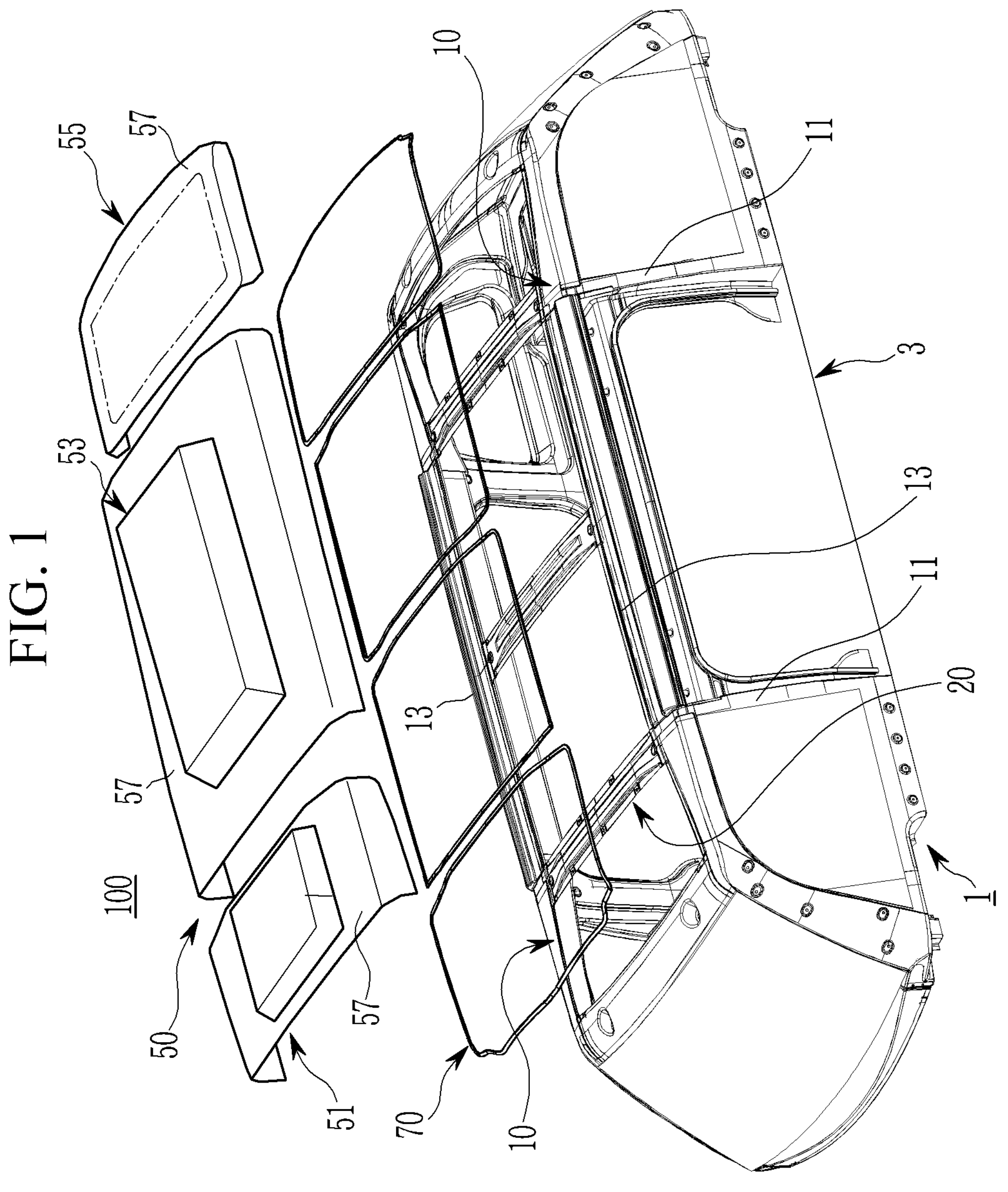
FIG. 1 and FIG. 2 are partially exploded perspective views showing a roof structure for a vehicle according to an exemplary embodiment.

The following reference identifiers may be used in connection with the accompanying drawings to describe exemplary embodiments of the present disclosure.

| | |
|---|---|
| 1: vehicle body | 3: upper body |
| 10: side structure | 11: pillar |
| 13: roof side | 20, 120: roof rail assembly |
| 20a: closed cross-section | 20b: closed space |
| 20c, 125a, 135a: penetration hole | 21, 121: upper rail panel |
| 23, 123: upper flange portion | 25, 125: upper rail portion |
| 31, 131: lower rail panel | 33, 133: lower flange portion |
| 35, 135: lower rail portion | 50, 150: roof module |
| 51: sensor roof module | 53: air conditioning roof module |
| 55: glass roof module | 57, 157: base |
| 60, 160: module mounting unit | 61, 161: mounting bracket |
| 63, 163: engage bolt | 65, 165: fastening nut |
| 70: adhesive sealer | 80: weather strip |
| 90: drainage path | 91: drainage channel |
| 93: path extension | 100, 200: roof structure for a vehicle |

The drawings referenced above are not necessarily drawn to scale but should be understood as presenting rather simplified representations of various preferred features illustrating the basic principles of embodiments of the present invention. Certain design features of embodiments of the present invention, including, for example, particular dimensions, orientations, locations, and shapes, will be determined in part by the particular intended application and use environment.

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing specific exemplary embodiments only and is not intended to limit the present disclosure. As used herein, the singular forms are intended to include the plural forms as well, unless the context clearly indicates otherwise.

The terms 'comprises' and/or 'comprising' as used herein indicate the presence of specified features, integers, steps, operations, elements, and/or components but do not exclude the presence or addition of one or more other features, integers, steps, operations, elements, components, and/or groups thereof. As used in this specification, the term 'and/or' includes any one or all combinations of at least one of the associated listed items. In this specification, the term 'connected' indicates a physical relationship between two components, for example, in which components are directly connected to each other by welding, self-piercing rivet (SPR), flow drill screw (FDS), structural adhesive, or the like, or in which components are indirectly connected through one or more intermediate components.

As used herein, 'vehicle', 'vehicular', 'automotive' or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based PBVs, hydrogen-powered vehicles, and other alternative fuel vehicles (e.g., other than petroleum fuel derived from resources).

Hereinafter, embodiments of the present invention will be described in detail with reference to the accompanying drawings.

Figure 2:
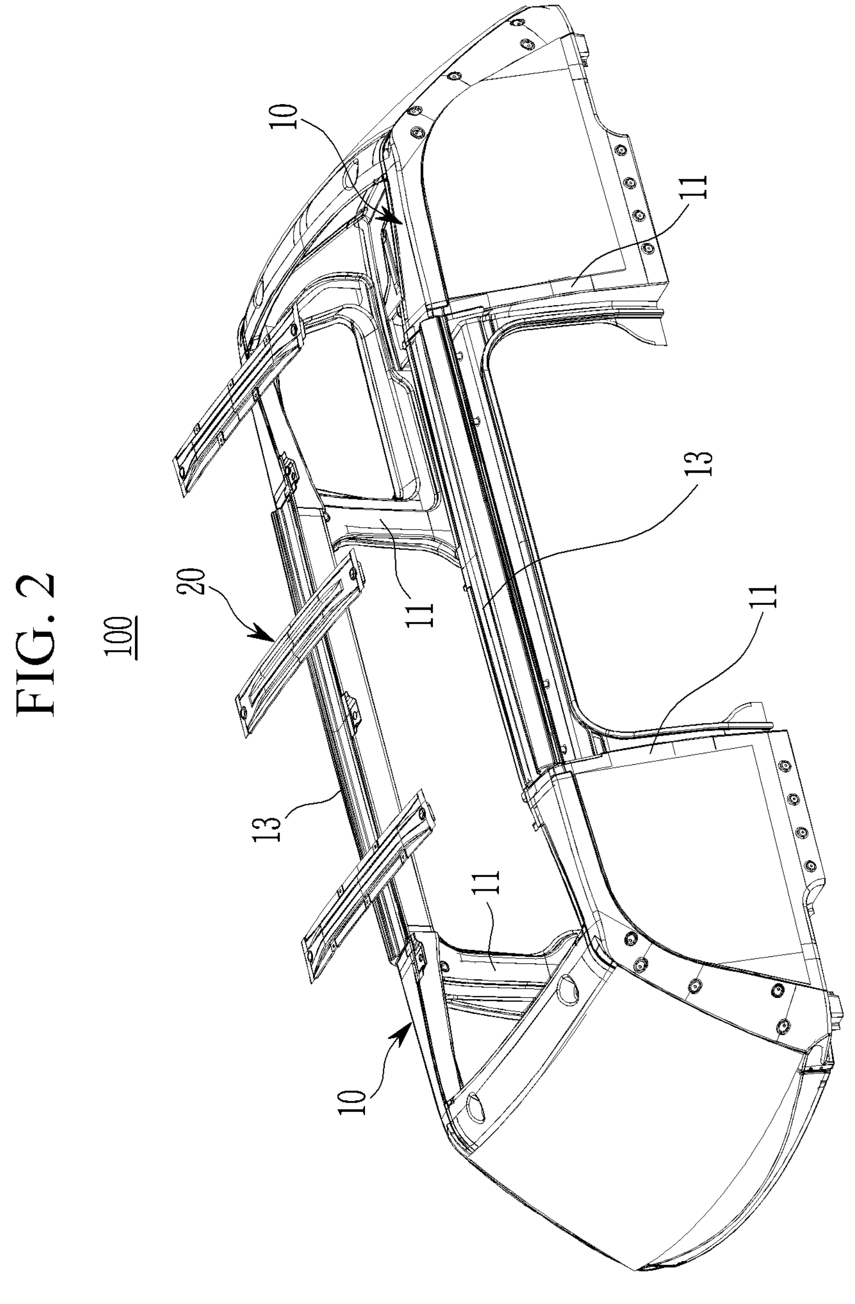
Figure 3:
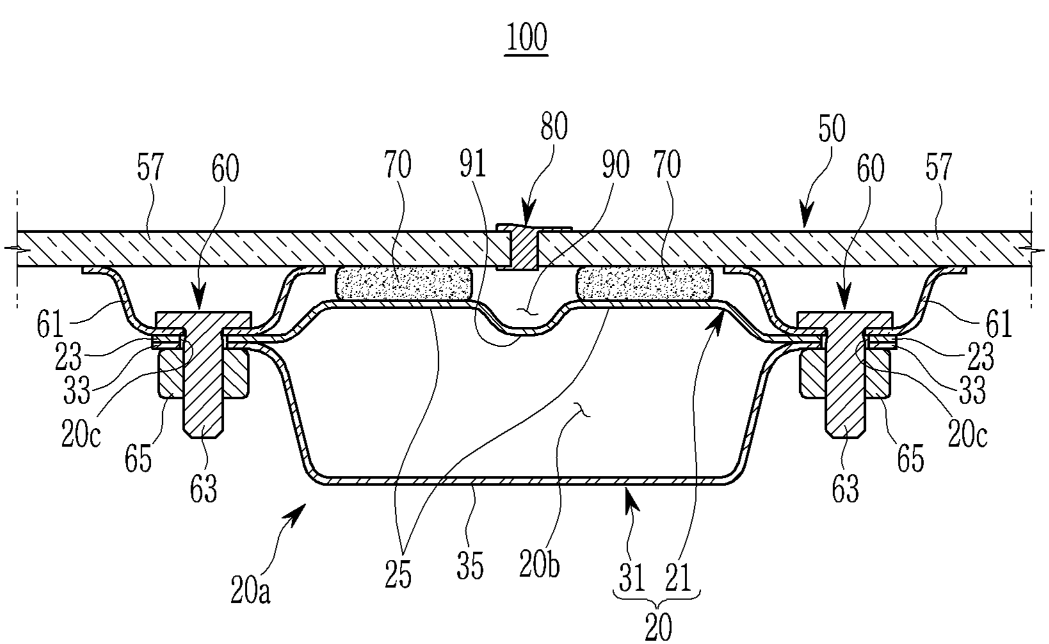
FIG. 3 is a cross-sectional view showing a roof structure for a vehicle according to an exemplary embodiment.

FIG. 1 and FIG. 2 are partially exploded perspective views showing a roof structure for a vehicle according to an exemplary embodiment, and FIG. 3 is a cross-sectional view showing a roof structure for a vehicle according to an exemplary embodiment.

Referring to FIG. 1 to FIG. 3, a roof structure wo for a vehicle according to an exemplary embodiment may be applied to, for example, a vehicle body 1 of a purpose-based mobility vehicle (Purpose Built Vehicle: hereinafter referred to as a 'PBV').

In one example, the PBV may be used as an electric vehicle-based life module vehicle that provides various services to occupants while moving from one place to a destination in an unmanned self-driving manner. The life module vehicle described above is also referred to as a 'robo taxi', a 'robo shuttle', or a 'hailing vehicle' by a person of ordinary skill in the art.

Such a PBV may be manufactured in a one box design with a large interior space. In addition, the PBV may apply a facing type seat to provide a wide interior space.

The vehicle body 1 of the PBV includes a skateboard type under body (not shown) (commonly referred to as a 'rolling chassis' or 'chassis frame' by those skilled in the art) and an upper body 3 assembled to the under body.

The under body may be equipped with a battery assembly (not shown) and a drive motor (not shown). And, the upper body 3 is a body-in-white (BIW) body coupled to the under body and may constitute a cabin with a wide indoor space.

In this specification, the 'front to rear direction of the vehicle body' may be defined as the longitudinal direction of the vehicle body, the 'vehicle width direction' may be defined as the left and right direction of the vehicle body, and the 'up-and-down direction' may be defined as the height direction of the vehicle body.

Furthermore, in this specification, 'upper end', 'upper portion', or 'upper surface' of a component indicates an end, portion, or surface of a component that is relatively upper in the drawing, and 'lower end', ' lower portion', or 'lower surface' of a component indicates an end, portion, or surface of a component that is relatively lower in the drawing.

Furthermore, in this specification, an end of a component (e.g., one end or another (other) end, etc.) denotes an end of a component in any one direction, and an end portion of the component (e.g., one end portion) or other (another) end portion, etc.) denotes a portion of a component that includes that end.

As described above, the upper body 3 includes side structures 10 provided on both sides along the vehicle width direction and the roof structure 100 coupled to upper portions of the side structures 10 according to an exemplary embodiment.

Each of the side structures 10 includes a plurality of pillars 11 and a roof side 13.

The plurality of pillars 11 are provided as pillars with relatively high strength in the side structures 10 and are disposed along the vertical direction. Furthermore, at least one of the plurality of pillars 11 may support a sliding door (not shown). Each of the roof sides 13 is connected to an upper portion of the plurality of pillars 11 along the front to rear direction of the vehicle body, respectively.

In this specification, the side structures 10 as described above may be divided into a front part, a center part, and a rear part along the front to rear direction of the vehicle body.

The roof structure 100 according to an exemplary embodiment may be mounted on the upper portions of the side structures 10. Such a roof structure 100 may provide an occupant with a wide interior space in a one box design PBV.

The roof structure 100 according to an exemplary embodiment may be a structure in which multifunctional roof modules such as autonomous driving sensors, air conditioning systems, and glass are mounted while securing the strength of the vehicle body 1.

The roof structure 100 according to an exemplary embodiment may include a plurality of roof rail assemblies 20, at least one roof module 50, a module mounting unit 60, an adhesive sealer 70, and a weather strip 80.

In an exemplary embodiment, the plurality of roof rail assemblies 20 are connected to the side structures 10 along the vehicle width direction. The plurality of roof rail assemblies 20 are disposed spaced apart along the front to rear direction of the vehicle body.

Here, the plurality of roof rail assemblies 20 may be connected to the front part, the center part, and the rear part of the side structures 10 through both ends along the vehicle width direction. Furthermore, both ends of the plurality of roof rail assemblies 20 may be connected (e.g., welded) to the roof sides 13 of the side structures 10.

Figure 4A:
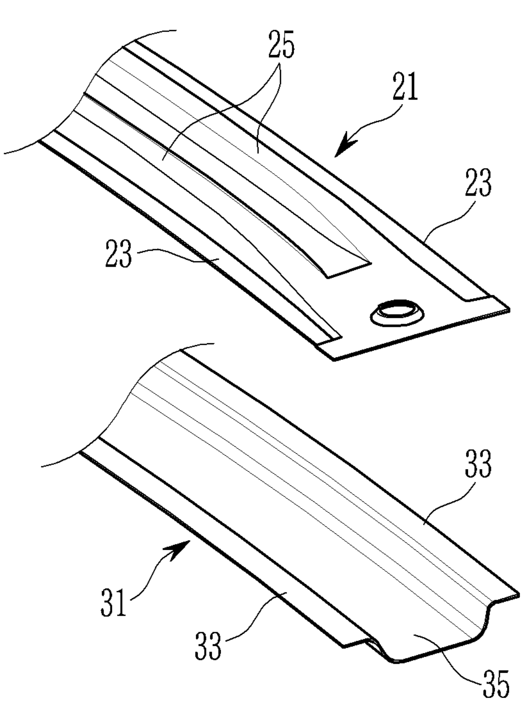
FIG. 4A and FIG. 4B are drawings showing a roof rail assembly applied to a roof structure according to an exemplary embodiment.
Figure 4B:
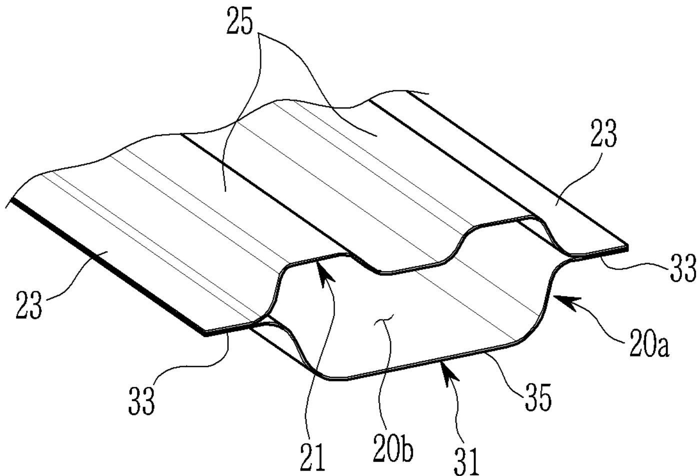

FIG. 4A and FIG. 4B are drawings showing a roof rail assembly applied to a roof structure according to an exemplary embodiment.

Each of the plurality of roof rail assemblies 20 as shown in FIG. 4A and FIG. 4B includes an upper rail panel 21 and a lower rail panel 31. The upper rail panel 21 and the lower rail panel 31 are connected to each other along the vertical direction. The upper rail panel 21 and the lower rail panel 31 connected together may form a closed cross-section 20*a* as shown in FIG. 3.

Specifically, the upper rail panel 21 includes an upper flange portion 23 and an upper rail portion 25. The upper flange portion 23 is formed on both edge portions of the upper rail panel 21 in the front to rear direction of the vehicle body. Each upper flange portion 23 is formed along the vehicle width direction. The upper rail portion 25 is formed between the upper flange portions 23. The upper rail portion 25 may be formed in a convex shape from lower to upper directions.

And, the lower rail panel 31 includes a lower flange portion 33 and a lower rail portion 35. The lower flange portion 33 is formed on both edge portions of the lower rail panel 31 in the front to rear direction of the vehicle body. Each lower flange portion 33 is formed along the vehicle width direction. The lower rail portion 35 is formed between the lower flange portions 33. The lower rail portion 35 may be formed in a convex shape from upper to lower directions.

The upper flange portion 23 and the lower flange portion 33 are connected (e.g., welded) to each other along a vertical direction. In the upper rail panel 21 and the lower rail panel 31 connected to each other through the upper flange portion 23 and the lower flange portion 33, a closed space 20*b* may be formed between the upper rail portion 25 and the lower rail portion 35. As described above, both ends of the upper rail panel 21 and the lower rail panel 31 along the vehicle width direction may be connected (e.g., welded) to the roof sides 13 of the side structures 10.

Referring to FIG. 1 to FIG. 3, in an exemplary embodiment, the at least one roof module 50 may be configured as a roof of the vehicle body 1. The at least one roof module 50 may include functional parts such as various operation systems and glass (or solar roof) of the PBV.

The at least one roof module 50 may be connected to the plurality of roof rail assemblies 20 along a vertical direction.

In one example, the at least one roof module 50 may include a sensor roof module 51, an air conditioning roof module 53, and a glass roof module 55 that are disposed adjacent to each other along the front to rear direction of the vehicle body.

Here, the sensor roof module 51 may be mounted on a plurality of roof rail assemblies 20 in the front part of the side structures 10. The sensor roof module 51 may include an autonomous driving sensor such as a camera, a lidar, a radar, and the like.

The air conditioning roof module 53 may be mounted on a plurality of roof rail assemblies 20 at the center part of the side structures 10. The air conditioning roof module 53 may include a ceiling air conditioning system.

In addition, the glass roof module 55 may be mounted on a plurality of roof rail assemblies 20 in the rear part of the side structures 10. The glass roof module 55 may include a sunroof glass.

Furthermore, the at least one roof module 50 as described above further includes a panel type base 57.

Referring to FIG. 1 to FIG. 3, in an exemplary embodiment, the module mounting unit 60 is configured to engage at least one roof module 50 and a plurality of roof rail assemblies 20 along a vertical direction.

The module mounting unit 60 according to an exemplary embodiment includes at least one mounting bracket 61, an engage bolt 63, and a fastening nut 65.

The at least one mounting bracket 61 is connected to a lower surface of the base 57 provided on the at least one roof module 50.

The engage bolt 63 is secured to at least one mounting bracket 61 and is disposed along the vertical direction. In one example, the engage bolt 63 may be a weld bolt connected to at least one mounting bracket 61. The engage bolt 63 is configured to pass through the upper flange portion 23 and the lower flange portion 33 connected to each other in the vertical direction in each of the upper rail panel 21 and the lower rail panel 31 of the plurality of roof rail assemblies 20. That is, the engage bolt 63 may be inserted into a penetration hole 20C formed in the upper flange portion 23 and the lower flange portion 33 connected to each other along a vertical direction.

Also, the fastening nut 65 may be engaged with an end (e.g., a lower end) of the engage bolt 63 penetrating the penetration hole 20C.

Referring to FIG. 1 to FIG. 3, in an exemplary embodiment, the adhesive sealer 70 is adapted to bond at least one roof module 50 and a plurality of roof rail assemblies 20. And the adhesive sealer 70 is configured to seal between at least one roof module 50 and a plurality of roof rail assemblies 20.

The adhesive sealer 70 may be applied between a lower edge portion of the base 57 provided in at least one roof module 50 and the roof side 13 of the side structure 10 and may be applied between the lower edge portion of the base 57 provided in at least one roof module 50 and the upper rail panel 21 of a plurality of roof rail assemblies 20.

Furthermore, the adhesive sealer 70 may be applied between the lower edge portion of the base 57 provided in at least one roof module 50 disposed adjacent to each other and the roof side 13 of the side structure 10 and may be applied between the lower edge portion of the base 57 provided in the at least one roof module 50 and the upper rail panel 21.

The adhesive sealer 70 may be disposed adjacent to each other along the front to rear direction of the vehicle body on the upper surface of the upper rail portion 25 of the upper rail panel 21.

In one example, such an adhesive sealer 70 is applied to the lower edge portion of the base 57 and may be adhered to the roof side 13 and the upper rail panel 21. In another example, the adhesive sealer 70 is applied to the roof side 13 and the upper rail panel 21 and may be adhered to the lower edge portion of the base 57.

Referring to FIG. 3, in an exemplary embodiment, the weather strip 80 is configured to seal between the roof modules 50 disposed adjacent to each other.

The weather strip 80 is provided between the roof modules 50 disposed adjacent to each other coupled to a plurality of roof rail assemblies 20.

The weather strip 80 may be coupled to an edge portion of the base 57 between the roof modules 50 disposed adjacent to each other.

Referring to FIG. 1 to FIG. 3, the roof structure wo according to an exemplary embodiment is configured to drain water inflow into a plurality of roof rail assemblies 20 between the roof modules 50 disposed adjacent to each other.

Figure 5:
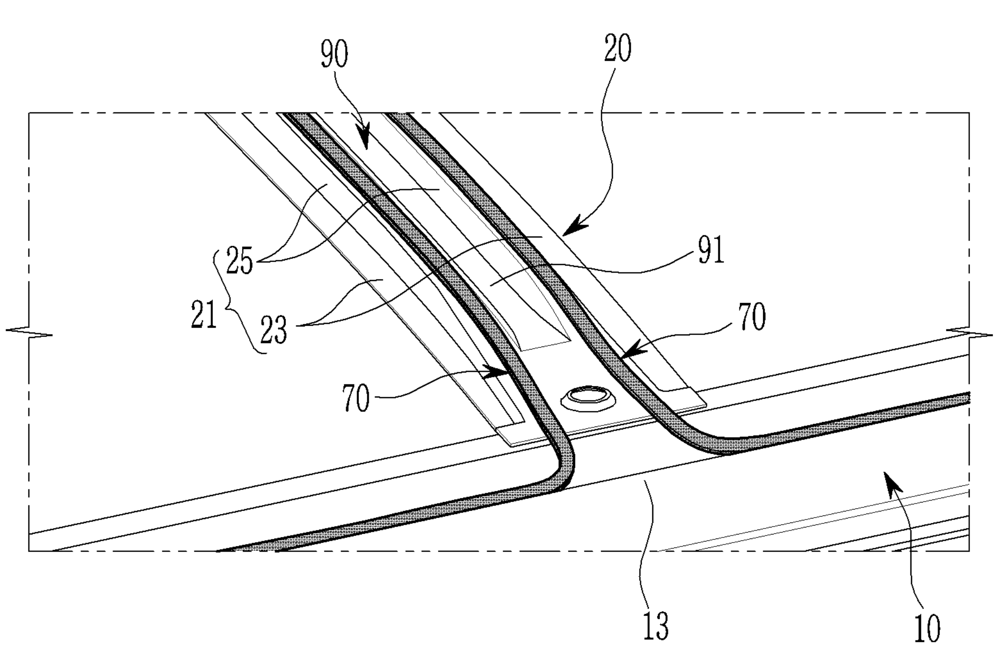
FIG. 5 and FIG. 6 are drawings showing a drainage structure applied to a roof structure for a vehicle according to an exemplary embodiment.
Figure 6:
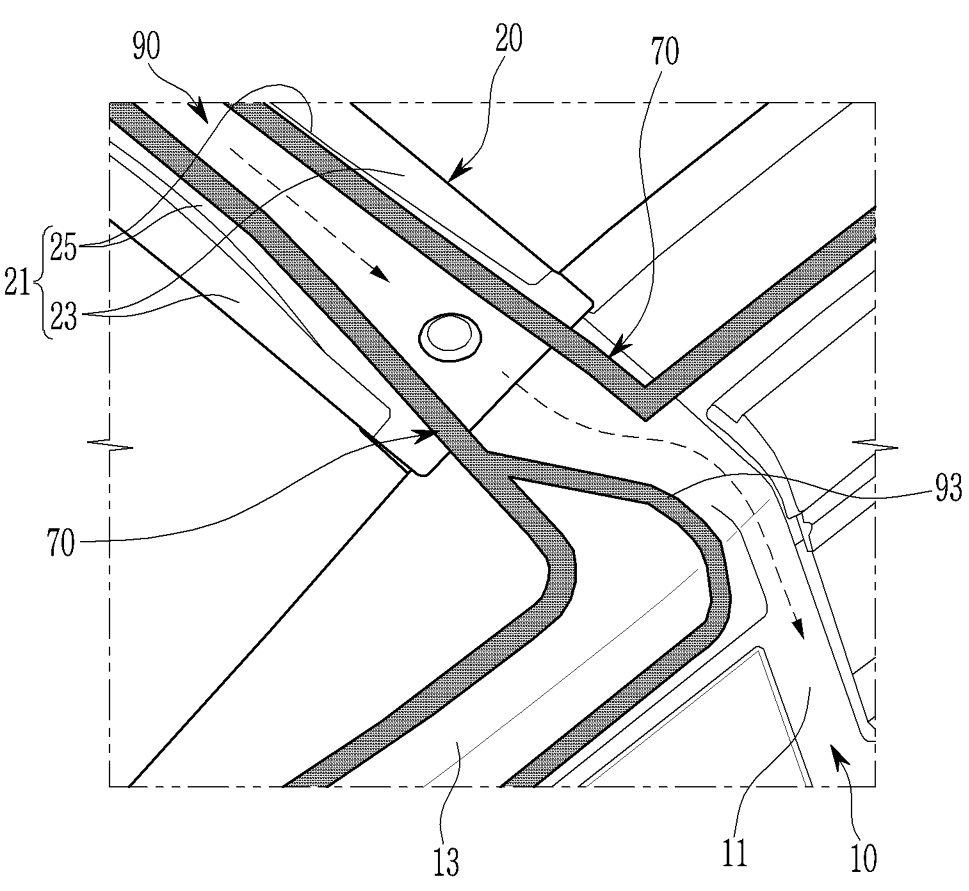

FIG. 5 and FIG. 6 are drawings showing a drainage structure applied to a roof structure for a vehicle according to an exemplary embodiment.

Referring to FIG. 3 and FIG. 5, the roof structure 100 according to an exemplary embodiment of the present invention includes the roof modules 50 disposed adjacent to each other and a drainage path 90 formed between a plurality of roof rail assemblies 20.

The drainage path 90 is formed along the vehicle width direction between adjacent adhesive sealers 70 on the upper surface of the upper rail portion 25 of the upper rail panel 21. The drainage path 90 may be formed as a drainage passage extending to the roof side 13 of the side structure 10 along the vehicle width direction.

The drainage path 90 may be formed by the adhesive sealers 70 adjacent to each other between the bases 57 of the roof modules 50 disposed adjacent to each other and the upper surface of the upper rail portion 25.

The upper rail panel 21 includes at least one drainage channel 91 formed along the drainage path 90 in the upper rail portion 25 between adjacent adhesive sealers 70.

On the upper surface of the upper rail portion 25, as shown in FIG. 6, a path extension 93 is formed on one of the adjacent adhesive sealers 70.

The path extension 93 extends the drainage path 90 to at least one of a plurality of pillars 11 provided in the side structure 10. The path extension 93 may direct water inflow into the drainage path 90 to at least one of a plurality of pillars 11.

The path extension 93 may be extended from one adhesive sealer 70 far from at least one of a plurality of pillars 11 among adjacent adhesive sealers 70 to another adhesive sealer 70 close to at least one of a plurality of pillars 11 on the upper surface of the upper rail portion 25.

Hereinafter, the operation of the roof structure 100 according to an exemplary embodiment of the present invention will be described in detail with reference to FIG. 1 to FIG. 6.

The upper rail panel 21 and the lower rail panel 31 connected to each other form the plurality of roof rail assemblies 20.

The plurality of roof rail assemblies 20 are connected to the roof sides 13 of the side structures 10 on both sides along the vehicle width direction and are spaced apart from each other along the front to rear direction of the vehicle body.

The roof modules 50 including the sensor roof module 51, the air conditioning roof module 53, and the glass roof module 55 is provided.

The roof modules 50 are bonded to the roof sides 13 of the side structures 10 and the upper rail panels 21 of the plurality of roof rail assemblies 20 by the adhesive sealer 70.

The adhesive sealer 70 is applied between the lower edge portion of the bases 57 of the roof modules 50 disposed adjacent to each other and the roof sides 13 and applied between the lower edge portion of the bases 57 of the roof modules 50 and the upper rail panel 21.

At least one mounting bracket 61 is connected with the lower surface of the base 57, and the engage bolt 63 is fixed to at least one mounting bracket 61.

In each upper rail panel 21 and lower rail panel 31 of a plurality of roof rail assemblies 20, the engage bolt 63 is inserted into the penetration hole 20C formed in the upper flange portion 23 and the lower flange portion 33 joined to each other along the vertical direction.

Between the roof modules 50 disposed adjacent to each other, the weather strip 80 is connected to the edge portion of the base 57.

A fastening nut 65 is engaged at the end of the engage bolt 63 penetrating the penetration hole 20C.

Accordingly, the roof modules 50 may be connected to a plurality of roof rail assemblies 20 along a vertical direction by engaging bolts 63 and fastening nuts 65.

According to the roof structure 100 according to an exemplary embodiment as described above, at least one roof module 50 is supported through a plurality of roof rail assemblies 20 formed of the closed cross-section 20*a*, and it is possible to secure the strength of the vehicle body 1 with a one box design.

In addition, the roof structure 100 according to an exemplary embodiment may secure a wider interior space of the PBV through at least one roof module 50 equipped with various functional parts and expands the service concept of the PBV.

Furthermore, the roof structure 100 according to an exemplary embodiment may seal between a plurality of roof rail assemblies 20 and at least one roof module 50 through the adhesive sealer 70 and the weather strip 80.

Therefore, the roof structure 100 according to an exemplary embodiment may secure watertight performance of a PBV equipped with at least one roof module 50.

The roof structure 100 according to an exemplary embodiment may include the drainage path 90 partitioned by the adhesive sealer 70 between a plurality of roof rail assemblies 20 and at least one roof module 50. In addition, the roof structure 100 according to an exemplary embodiment includes at least one drainage channel 91 formed along the drainage path 90 in the upper rail panel 21 of a plurality of roof rail assemblies 20. In addition, the roof structure 100 according to an exemplary embodiment includes the path extension 93 configured to extend the drainage path 90 to at least one of a plurality of pillars 11 provided in the side structure 10.

As a result, according to the roof structure 100 according to an exemplary embodiment, when water inflows between the roof modules 50 disposed adjacent to each other, the water may be smoothly exhausted to the side of vehicle body 1 through the drainage path 90, at least one drainage channel 91, and the path extension 93.

Figure 7:
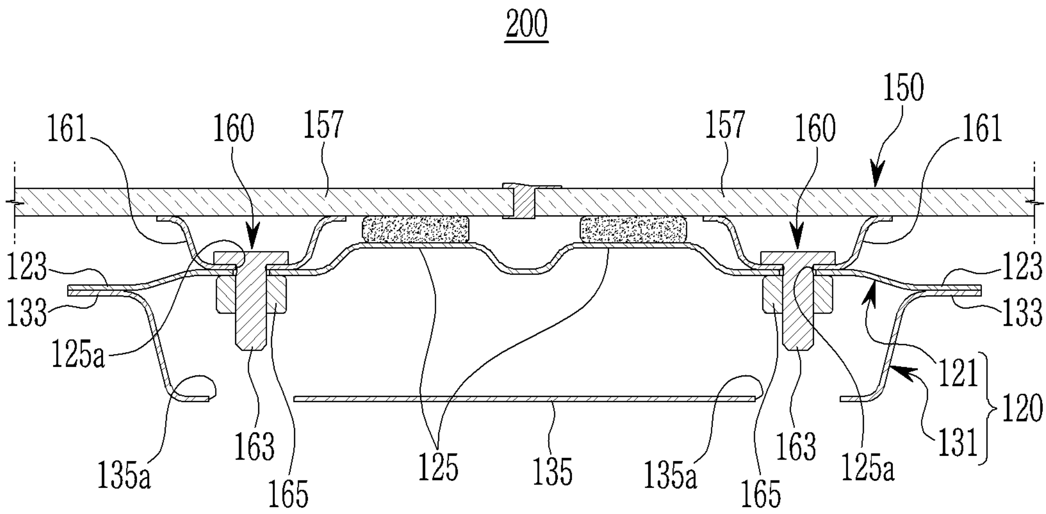
FIG. 7 is a cross-sectional view showing a roof structure for a vehicle according to another exemplary embodiment.

FIG. 7 is a cross-sectional view showing a roof structure for a vehicle according to another exemplary embodiment.

Referring to FIG. 7, a roof structure 200 for a vehicle according to another exemplary embodiment includes a plurality of roof rail assemblies 120 having a width wider than that of the plurality of roof rail assemblies 20 in FIG. 3 as in the exemplary embodiment described above. Here, the width may be a width in a front to rear direction of the vehicle body in a plurality of roof rail assemblies 120 disposed along the vehicle width direction.

Furthermore, the roof structure 200 according to another exemplary embodiment includes a module mounting unit 160 configured to mount at least one roof module 150 to a plurality of roof rail assemblies 120.

Each of the plurality of roof rail assemblies 120 includes an upper rail panel 121 and a lower rail panel 131, as in the previous exemplary embodiment. The upper rail panel 121 includes an upper flange portion 123 and an upper rail portion 125, as in the previous exemplary embodiment. And, the lower rail panel 131 includes a lower flange portion 133 and a lower rail portion 135, as in the previous exemplary embodiment. Here, the upper flange portion 123 and the lower flange portion 133 may be connected by welding along a vertical direction.

The module mounting unit 160 includes at least one mounting bracket 161, an engage bolt 163, and a fastening nut 165.

The at least one mounting bracket 161 is connected to the lower surface of a base 157 provided on the at least one roof module 150.

The engage bolt 163 is secured to at least one mounting bracket 161 and is disposed along the vertical direction. The engage bolt 163 is configured to pass through an upper rail portion 125 of the upper rail panel 121 in the vertical direction in the upper rail panel 121 and lower rail panel 131 connected to each other of the plurality of roof rail assemblies 120. The engage bolt 163 may be inserted into a penetration hole 125*a* formed in the upper rail portion 125 along a vertical direction.

And, the fastening nut 165 penetrates the lower rail portion 135 of the lower rail panel 131 along the vertical direction. A penetration hole 135*a* through which the fastening nut 165 penetrates is formed in the lower rail portion 135. The fastening nut 165 may pass through the penetration hole 135*a* formed in the lower rail portion 135 and engage the lower part of the engage bolt 163 passing through the penetration hole 125*a* of the upper rail portion 125.

Accordingly, the at least one roof module 150 may be connected to a plurality of roof rail assemblies 120 in a vertical direction by the engaging bolts 163 and the fastening nuts 165.

The rest of the configuration and operation of the roof structure 200 for a vehicle according to another exemplary embodiment as described above are the same as in the previous exemplary embodiment, so detailed descriptions are omitted.

While embodiments of this invention have been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A roof structure for a vehicle, the roof structure comprising:

a plurality of roof rail assemblies each comprising an upper rail panel and a lower rail panel, wherein each of the plurality of roof rail assemblies is disposed along a vehicle width direction of a vehicle body and connected to a pair of side structures that are disposed on each side of the vehicle body along a front to rear direction of the vehicle body;

a roof module connected to the plurality of roof rail assemblies; and an adhesive sealer between a lower edge portion of a base provided in the roof module and a roof side of one of the side structures and between the lower edge portion of the base provided in the roof module and the upper rail panels of the plurality of roof rail assemblies, wherein a drainage path is defined along the vehicle width direction of the vehicle body between the adhesive sealers adjacent to each other on upper surfaces of the upper rail panels.

2. The roof structure of claim 1, wherein each of the plurality of roof rail assemblies comprises the upper rail panel and the lower rail panel, of each of the plurality of roof rail assemblies, are connected together to define a closed cross-section.

3. The roof structure of claim 2, wherein:

the upper rail panel, of each of the plurality of roof rail assemblies, comprises upper flange portions disposed on both edge portions along the front to rear direction of the vehicle body and an upper rail portion disposed between the upper flange portions; and the lower rail panel, of each of the plurality of roof rail assemblies, comprises lower flange portions disposed on both edge portions along the front to rear direction of the vehicle body and a lower rail portion disposed between the lower flange portions.

4. The roof structure of claim 3, wherein:

the upper flange portions and the lower flange portions are connected to each other; and a closed space is defined between the upper rail portions and the lower rail portions.

5. The roof structure of claim 1, wherein the roof module comprises a sensor roof module, an air conditioning roof module, or a glass roof module.

6. The roof structure of claim 1, wherein the roof module comprises a sensor roof module, an air conditioning roof module, and a glass roof module disposed adjacent to each other along the front to rear direction of the vehicle body.

7. The roof structure of claim 1, further comprising a path extension on the adhesive sealer configured to extend the drainage path to a pillar of one of the side structures.

8. A roof structure for a vehicle, the roof structure comprising:

a plurality of roof rail assemblies each comprising an upper rail panel and a lower rail panel connected to each other, each of the plurality of roof rail assemblies extending along a vehicle width direction of a vehicle body with each end respectively being connected to one of a pair of side structures extending along each side of the vehicle body in a front to rear direction of the vehicle body;

a roof module connected to the plurality of roof rail assemblies;

a module mounting unit coupling the roof module and the plurality of roof rail assemblies along a vertical direction; and an adhesive sealer between a lower edge portion of a base provided in the roof module and a roof side of one of the side structures and between the lower edge portion of the base provided in the roof module and the upper rail panels of of the plurality of roof rail assemblies, wherein a drainage path is defined along the vehicle width direction of the vehicle body between the adhesive sealers adjacent to each other on upper surfaces of the upper rail panels.

9. The roof structure of claim 8, wherein:

the upper rail panel, of each of the plurality of roof rail assemblies, comprises an upper flange portion disposed on both edge portions along the front to rear direction of the vehicle body and an upper rail portion disposed between the upper flange portions; and the lower rail panel, of each of the plurality of roof rail assemblies, comprises a lower flange portion disposed on both edge portions along the front to rear direction of the vehicle body and a lower rail portion disposed between the lower flange portions.

10. The roof structure of claim 9, wherein:

the upper flange portion and the lower flange portion are connected to each other; and a closed space is defined between the upper rail portion and the lower rail portion.

11. The roof structure of claim 9, wherein the module mounting unit comprises:

a mounting bracket connected to a lower surface of the base provided in the roof module;

an engage bolt fixed to the mounting bracket so as to pass through the upper flange portion and the lower flange portion connected together in the vertical direction; and a fastening nut engaged with the engage bolt.

12. The roof structure of claim 9, wherein the module mounting unit comprises:

a mounting bracket connected to a lower surface of the base provided in the roof module;

an engage bolt fixed to the mounting bracket to pass through the upper rail portion along the vertical direction; and a fastening nut penetrating the lower rail portion and engaged with the engage bolt.

13. The roof structure of claim 8, wherein the roof module comprises a plurality of roof modules, and wherein the roof structure further comprises a weather strip provided between the roof modules that are disposed adjacent to each other.

14. A roof structure for a vehicle, the roof structure comprising:

a plurality of roof rail assemblies each comprising an upper rail panel and a lower rail panel connected to each other, each of the plurality of roof rail assemblies extending along a vehicle width direction of a vehicle body with each end respectively being connected to one of a pair of side structures extending along each side of the vehicle body in a front to rear direction of the vehicle body;

a plurality of roof modules disposed in the front to rear direction of the vehicle body and connected to respective ones of the plurality of roof rail assemblies;

a plurality of module mounting units coupling the roof modules and the roof rail assemblies along a vertical direction; and an adhesive sealer between lower edge portions of bases provided in the roof modules and roof sides of the side structures and between the lower edge portions of the bases provided in the roof modules and the upper rail panels, wherein a drainage path is defined along the vehicle width direction of the vehicle body between the adhesive sealers adjacent to each other on upper surfaces of the upper rail panels.

15. The roof structure of claim 14, wherein each of the upper rail panels comprises a drainage channel along the drainage path.

16. The roof structure of claim 15, further comprising a path extension on one of the adhesive sealers to extend the drainage path to a pillar of one of the side structures.

17. The roof structure of claim 14, wherein the plurality of roof modules comprises a sensor roof module, an air conditioning roof module, and a glass roof module disposed adjacent to each other along the front to rear direction of the vehicle body.

18. The roof structure of claim 14, wherein the roof structure further comprises a weather strip provided between the roof modules that are disposed adjacent to each other.

19. The roof structure of claim 14, wherein each of the plurality of module mounting units comprises a mounting bracket connected to a lower surface of the base of a respective roof module, an engage bolt fixed to the mounting bracket, and a fastening nut engaged with the engage bolt.

20. The roof structure of claim 14, wherein an upper rail portion of each of the upper rail panels is formed in a convex shape from lower to upper directions.

* * * * *